United States Patent

[11] 3,611,041

[72] Inventors Toshio Itoh;
Toshio Miyamoto; Yuichi Wada, all of Amagasaki, Japan
[21] Appl. No. 845,862
[22] Filed July 29, 1969
[45] Patented Oct. 5, 1971
[73] Assignee Mitsubishi Denki Kabushiki Kaisha Tokyo, Japan
[32] Priority July 30, 1968
[33] Japan
[31] 43/53851

[54] CURRENT-LIMITING DEVICE
10 Claims, 1 Drawing Fig.
[52] U.S. Cl. .................................. 317/20,
317/33 SC, 337/114, 337/159
[51] Int. Cl. ................................. H02h 5/04,
H01h 37/36
[50] Field of Search ............................. 317/20, 54,
33 SC; 337/114, 119, 151, 152, 158, 159, 290,
315, 326, 331, 401, 402, 403, 404, 405, 407, 409

[56] References Cited
UNITED STATES PATENTS
3,501,677 3/1970 Hurtle .................. 317/33
3,501,730 3/1970 Ito et al. ............... 337/159
3,504,233 3/1970 Hurtle .................. 317/33 X Primary Examiner—James D. Trammell
Attorneys—Robert E. Burns and Emmanuel J. Lobato ABSTRACT: A current-limiting material fills a hole extending through a solid insulation interposed between stationary and movable electrodes to normally effect electrical interconnection of both electrodes. When two controlled rectifiers of opposite polarity connected serially to the stationary electrode are in their closed position by a pulse generator a flow of overcurrent through the limiting material causes it to vaporize to insulate the stationary electrode from the movable electrode while the latter is moved away from the former to disconnect the rectifiers from the generator to open them. After interruption of the overcurrent reclosure of the rectifiers causes the associated two terminals to be electrically interconnected.

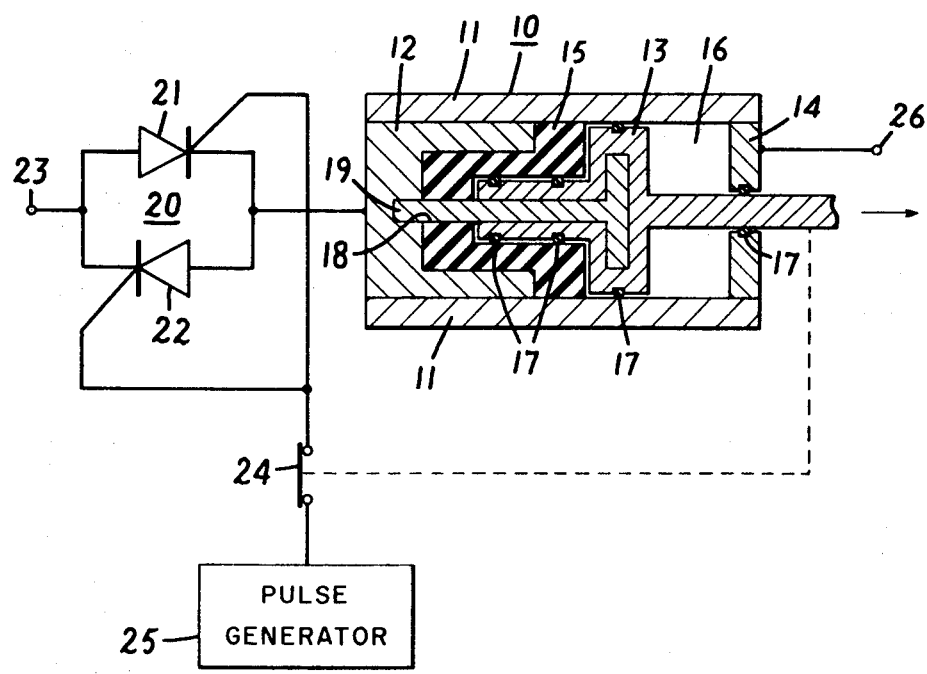

3,611,041

CURRENT-LIMITING DEVICE

CROSS REFERENCE TO RELATED APPLICATIONS

Reference is made to the following copending applications:
U.S. application Ser. No. 708,048, now U.S. Pat. No. 3,501,730, entitled
  Current Limiting Equipment, filed by Toshio Ito, Toshio Miyamoto, Yutaka Murai and Yuichi Wada on Feb. 26, 1968 and assigned to the same assignee as the present application.
U.S. application Ser. No. 708,406 entitled
  Current Limiting Circuit, filed by Toshio Ito, Toshio Miyamoto, Yutaka Murai and Yuichi Wada on Feb. 26, 1968, and assigned to the same assignee as the present application. U.S. application Ser. No. 708,653 now U.S. Pat. No. 3,488,761 entitled
  Current Limiting Device, filed by Toshio Ito, Toshio Miyamoto and Yuichi Wada and assigned to the same assignee as the present application.

BACKGROUND OF THE INVENTION

This invention relates to improvements in a current-limiting device of the type using a current-limiting material having the self-restoring property.

There have been previously proposed various current-limiting devices of the type referred to. For example, the above cited copending U.S. application Ser. No. 708,048 describes and claims a current-limiting equipment including pressure buffer means for preventing a pressure within the device from excessively rising upon vaporizing a current-limiting material involved due to a flow of overcurrent therethrough. The above cited copending U.S. application Ser. No. 708,406 discloses and claims a current-limiting circuit comprising a current-limiting device of the type referred to and an ordinary switch connected in parallel circuit relationship to the current-limiting device and permitting a flow of nominal stationary current therethrough in order to allow a high current to readily flow through the circuit in response to an increase in capability of the associated circuitry and also to select, at will, a time point at which the current-limiting operation is started by controlling a time point at which the parallel switch is brought into its open position, and if desired, in order to effect selective interruption for current-limiting purpose. Further the above cited copending U.S. application Ser. No. 708,653 describes and claims a current-limiting device including a housing filled with a current-limiting material and having at least one portion formed of an electrically resisting material disposed in parallel circuit relationship with the current-limiting material for the purpose of suppressing any extraordinary voltage that may be developed across the device during the current-limiting operation.

With all the measures as above outlined, a flow of overcurrent through the particular current-limiting material causes the material to vaporize to interrupt the associated device. After a predetermined interval of time the vaporized material is cooled to be liquidized or solidified to restore the device to the original conductive state. It is highly desirable to provide means for causing a current to flow through the current-limiting material even though the material was restored to its conductive state and only after the particular overcurrent fault has been removed.

SUMMARY OF THE INVENTION

Accordingly it is an object of the invention to provide a new and improved current-limiting device including a current limiting material having the self-resoting property and electrical means for causing the associated connection terminals to be again electrically connected together only after that means have been again put in the conducting state.

The invention accomplishes this object by the provision of a current-limiting device comprising, in combination, a current-limiting element including a first electrode and a second electrode disposed in spaced opposite relationship, a solid body of electrically insulating material for electrically insulating the first electrode from the second electrode, and an amount of current-limiting material filling a hole extending through the insulating solid body to contact the first and second electrodes, the amount of current-limiting material being effective for normally maintaining electrical connection of the first electrode to the second electrode and responding to a flow of overcurrent therethrough to vaporize thereby to electrically insulate the first electrode from the second electrode; and semiconductor-controlled rectifier means connected in series circuit relationship with the current-limiting element and responsive to vaporization of the current-limiting material to become nonconducting.

BRIEF DESCRIPTION OF THE DRAWING

The invention will become readily apparent from the following detailed description taken in conjunction with the accompanying drawing in which a single FIGURE is a schematic view of a current-limiting device and an electrical control system therefor constructed in accordance with the principles of the invention with parts illustrated in longitudinal section.

DESCRIPTION OF THE PREFERRED EMBODIMENT

Referring now to the drawing, it is seen that an arrangement disclosed herein comprises a current-limiting element generally designated by the reference numeral 10 and an electric control system generally designated by the reference numeral 20 for controlling the element 10 in the manner as will be described hereinafter. The current-limiting element 10 comprises a hollow cylindrical casing 11 of any suitable electrically insulating material, a first electrode 12 in the form of a cup rigidly secured to the inner peripheral surface of the casing 11 and having an outer bottom face substantially flush with one end face of the casing 11, and a second electrode of cross-shaped section movably supported to the inner peripheral surface of the casing 11 by having its radial protrusion slidably contacting that surface of the casing. The second electrode 13 has one end portion in the form of a rod partly extending into the "cup" to form a gap therebetween and the other end portion movably extending through a metallic end plate 14 closing the other end of the casing 11 and serving as a leadin electrode for the same. The gap between the first and second electrodes 12 and 13 is filled with a solid body 15 of any suitable electrically insulating material fixed to both the first electrode 12 and the adjacent portion of the inner peripheral surface of the casing 11 and separable from that portion of the second electrode 13 substantially contacting the same. The insulating solid body is preferably formed of a mixture of powdered mica and powder glass moulded at a high temperature under a high pressure into the desired shape.

Any suitable pressurized gas 16 fills a space formed between the end plate 14 and the radial protrusion of the second electrode 13 within the casing 11 for the purpose as will be apparent later. In order to prevent any leakage of the pressurized gas 16 from the space occupied by it, a plurality of antileakage members 17 such as O-rings are disposed on those portions of the second electrode 13 substantially contacting the adjacent portions of the insulating solid body 15, the inner peripheral surface of the casing 11, and the end plate 14.

A hole 18 centrally extends through the insulating solid body 15 and has one end terminating in the first electrode 12. The hole 18 also extends through that rod-shaped portion of the second electrode 13 near the first electrode 12 and terminates at a circular space disposed in the radial protrusion of the second electrode 13. The hole 18 is then filled with any suitable current limiting material 19 with a self-restoring property. The current-limiting material is in liquid or solid state and electrically conductive at room temperature. However, when heated it vaporizes to become electrically nonconductive. When the vaporized material is cooled it is restored to its original liquid or solid state as the case may be to become conductive. As described in the cited applications, suitable examples of the current-limiting material involve sodium (Na), potassic sodium (NaK), potassium (K), gallium (Ga), iron-cobalt alloys, silver (Ag), etc. In practicing the invention, it is preferable to use a current-limiting material normally in liquid state. The electric control system 20 comprises a pair of semiconductor controlled rectifiers 21 and 22 electrically connected in inverse parallel relationship with each other with the junction of the cathode and anode respectively of the controlled rectifiers 21 and 22 electrically connected in series to the first electrode 12. The junction of the anode and cathode respectively of the controlled rectifiers 21 and 22 is electrically connected to one of connection terminals 23. Both the controlled rectifiers 21 and 22 have the respective gate electrodes electrically connected to a switching element, in this case, electric contacts 24 shown as being normally closed and thence to a pulse generator 25 for generating gating pulses which are, in turn, applied to the gate electrodes of both the controlled rectifiers 21 and 22. As shown by dash line, the contacts 24 are mechanically connected to the second electrode 13 and electrically connected to the other terminal 26 through the end plate 14.

With the controlled rectifiers 21 and 22 put in their closed position, any flow of overcurrent across the connection terminals 23 and 26 through the current-limiting element 10 causes the current-limiting material 18 to vaporize thereby to electrically isolate the first electrode 12 from the second electrode 13. That is, the overcurrent is interrupted. At the same time the vaporized material 18 provides a high pressure in the hole 18 to cause the second electrode 13 to be moved in the direction of the arrow away from the first electrode 12 and against the action of the pressurized gas 16. This movement of the second electrode 13 permits the contacts 24 to be open whereupon the pulse generator 25 is disconnected from the gate electrodes of the controlled rectifiers 21 and 22 to open them. This ensures that the terminal 23 is maintained insulated from the terminal 26.

After that interrupting state is maintained for a predetermined interval of time, the vaporized material is cooled to be liquidized whereupon the first electrode 12 is again electrically connected to the second electrode 13. However, the terminal 23 can not be electrically connected to the other terminal 26 because the controlled rectifiers 21 and 22 are put in their open position. After the particular overcurrent fault has been removed the second electrode 13 can be returned back to its original position in readiness for the succeeding operation.

From the foregoing it will be appreciated that once the current-limiting element 10 has been put in its open position the electrical connection of the one to the other connection terminals can not be again attained unless the controlled rectifiers are brought into their conducting state.

While the invention has been illustrated and described in conjunction with a single preferred embodiment thereof it is to be understood that various changes and modifications may be resorted to without departing from the spirit and scope of the invention. For example, the pulse generator 25 may be caused to be deenergized in response to the movement of the second electrode 13. Alternatively a resistor may be electrically connected across the first and second electrodes 12 and 13 respectively. Then a voltage drop across the resistor developed upon vaporizing the current-limiting material is utilized to deenergize the pulse generator 25 thereby to render the controlled rectifiers nonconducting. If desired, the second electrode may be stationary.

What we claim is:

1. A current-limiting device comprising an insulating casing, a first electrode in said casing, a second electrode disposed in said casing in spaced relation to said first electrode and movable between a first position nearer said electrode and a second position farther from said first electrode, means for biasing said second electrode to said first position, an amount of conductive vaporizable current-limiting material disposed between said electrodes and normally making electrical connection between them, circuit means electrically connected with said electrodes and including movable contact means operatively connected with said second electrode to be operated by movement of said second electrode, said current-limiting material being vaporized by a flow of overcurrent therethrough to electrically insulate said first electrode from said second electrode and to move said second electrode by vapor pressure against said bias and thereby operate said movable contact means.

2. A current limiting device according to claim 1, in which a solid insulating body disposed in said basing between said electrodes has a bore which extends between said electrodes and in which said vaporizable current-limiting material is disposed.

3. A current-limiting device according to claim 2, in which at least one of said electrodes has a recess which is aligned with said bore in said solid insulating body and in which said vaporizable current-limiting material is in part disposed.

4. A current-limiting device according to claim 2, in which said solid insulating body has a recess facing said second electrode and in which said second electrode has a stem portion slidably received and guided in said recess.

5. A current-limiting device according to claim 4, in which fluidtight-sealing means is provided between said stem portion of the second electrode and a wall of said recess.

6. A current-limiting device according to claim 1, in which fluidtight-sealing means is provided between said second electrode and said casing.

7. A current-limiting device according to claim 6, in which said casing is closed at one end to provide a chamber between said end and said second electrode and in which said biasing means comprises gas confined in said chamber.

8. A current-limiting device according to claim 1, in which said casing has a closure at one end and said second electrode has a stem portion extending out through an aperture in said closure for mechanical connection to said movable contact means.

9. A current-limiting device according to claim 1, in which said circuit means comprises semiconductor-controlled rectifier means connected in series relationship with said electrodes and means supplying gating signals to said semiconductor-controlled rectifier means, said movable contact means controlling the supply of gating signals to said semiconductor-controlled rectifier means by said signal supplying means.

10. A current-limiting device according to claim 9, in which said semiconductor-controlled rectifier means comprises a pair of semiconductor-controlled rectifiers electrically connected in inverse parallel relationship.